US011865755B2

(12) United States Patent
Henderson et al.

(10) Patent No.: US 11,865,755 B2
(45) Date of Patent: Jan. 9, 2024

(54) LARGE PART INJECTION MOLD APPARATUS AND PROCESS

(71) Applicant: Synventive Molding Solutions, Inc., Peabody, MA (US)

(72) Inventors: William Henderson, Jiangsu (CN); Ling Feng, Jiangsu (CN); Andrew Dovey, Peabody, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

(21) Appl. No.: 17/964,151

(22) Filed: Oct. 12, 2022

(65) Prior Publication Data

US 2023/0034476 A1 Feb. 2, 2023

Related U.S. Application Data

(60) Division of application No. 15/833,003, filed on Dec. 6, 2017, now Pat. No. 11,491,693, which is a continuation of application No. PCT/US2017/061332, filed on Nov. 13, 2017.

(Continued)

(51) Int. Cl.
*B29C 45/22* (2006.01)
*B29C 45/76* (2006.01)
(Continued)

(52) U.S. Cl.
CPC .......... *B29C 45/7613* (2013.01); *B29C 45/22* (2013.01); *B29C 45/231* (2013.01);
(Continued)

(58) Field of Classification Search
CPC .......... B29C 2945/76083; B29C 2945/76006; B29C 2945/76993; B29C 2945/76939;
(Continued)

(56) References Cited

U.S. PATENT DOCUMENTS

| 5,556,582 A | 9/1996 | Kazmer |
| 2004/0047935 A1 | 3/2004 | Moss |

(Continued)

FOREIGN PATENT DOCUMENTS

| WO | 2010/101709 A2 | 9/2010 |
| WO | 2014/093849 A2 | 6/2014 |

OTHER PUBLICATIONS

International Preliminary Report on Patentability in corresponding PCT application PCT/US2017/061332 dated May 14, 2019.

(Continued)

*Primary Examiner* — Alison L Hindenlang
*Assistant Examiner* — Debjani Roy
(74) *Attorney, Agent, or Firm* — CANTOR COLBURN LLP

(57) ABSTRACT

A method of performing an injection cycle having a duration comprising:
beginning the injection cycle with the valve pins associated with two or more nozzles in a gate closed position,
selecting a first one of the two or more nozzles and controllably driving its associated valve pin from the gate closed position to a selected first axial upstream position,
upon downstream flow of the injection fluid through a cavity the preselected distance, controllably driving the valve pin associated with the other of the two or more nozzles to a selected second axial position upstream,
holding or controllably driving the valve pin associated with the first one of the two or more nozzles in or to one or more reduced flow axial upstream positions that are partially closed.

20 Claims, 4 Drawing Sheets

Related U.S. Application Data

(60) Provisional application No. 62/421,674, filed on Nov. 14, 2016.

(51) Int. Cl.
    *B29C 45/23*     (2006.01)
    *B29C 45/77*     (2006.01)
    *B29C 45/27*     (2006.01)

(52) U.S. Cl.
    CPC ........ *B29C 45/77* (2013.01); *B29C 2045/279* (2013.01); *B29C 2945/76545* (2013.01); *B29C 2945/76688* (2013.01); *B29C 2945/76939* (2013.01)

(58) Field of Classification Search
    CPC .. B29C 2945/76755; B29C 2045/2824; B29C 2045/2865; B29C 2045/2872
    See application file for complete search history.

(56) References Cited

U.S. PATENT DOCUMENTS

| | | | |
|---|---|---|---|
| 2005/0046803 A1* | 3/2005 | Akutsu | H04N 9/3194 353/69 |
| 2014/0046465 A1 | 2/2014 | De Oliveira | |
| 2016/0167264 A1 | 6/2016 | Bazzo | |

OTHER PUBLICATIONS

International Search Report and Written Opinion in corresponding PCT Application No. PCT/US2017/061332 dated Jan. 24, 2018.

\* cited by examiner

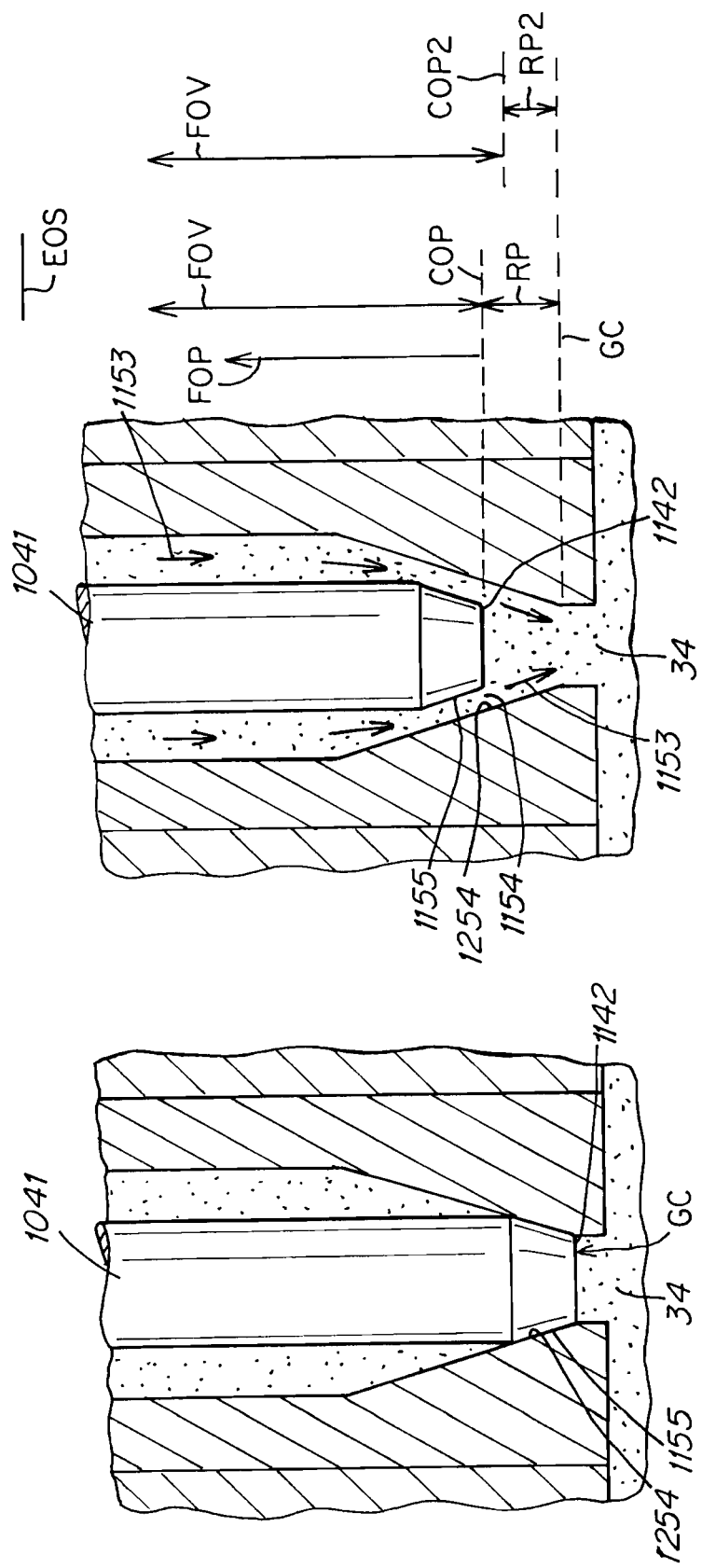

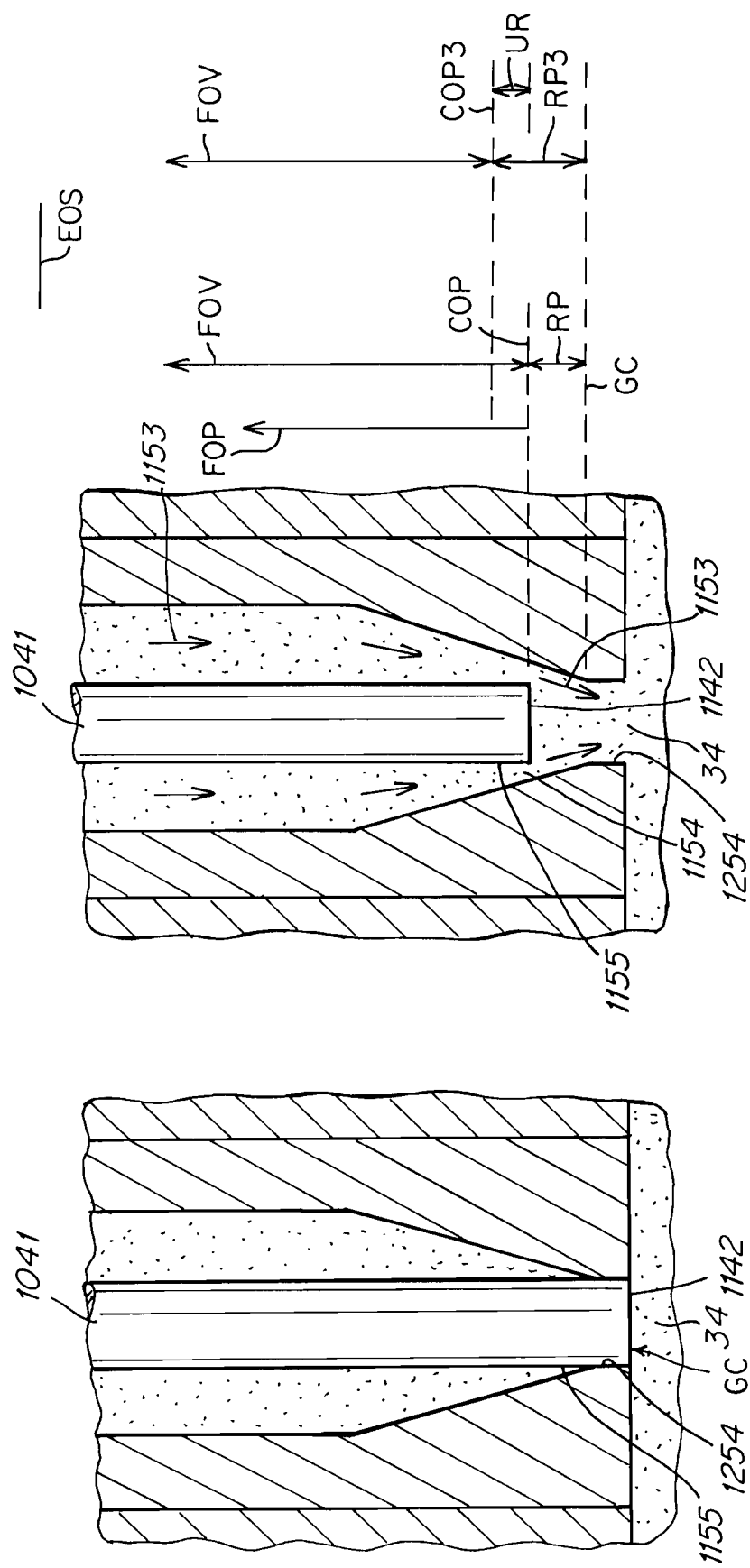

LARGE PART INJECTION MOLD APPARATUS AND PROCESS

RELATED APPLICATIONS

This application is a continuation of and claims the benefit of priority to PCT/US17/061332 filed Nov. 13, 2017 which in turn claims the benefit of priority to U.S. Provisional Application No. 62/421,674 filed Nov. 14, 2016 the disclosures of both of which are incorporated by reference as if fully set forth in their entirety herein.

Injection molding is a fairly mature industry. The production of plastic parts is commonplace for almost all sectors of the manufacturing industry. A basic injection molding tool involves a core, a cavity and an entry point for the plastic to enter the cavity. The entry point is typically called the gate. The tool is installed in an injection molding machine (IMM) which opens, closes, and clamps the tool and ejects the part. It also melts or plasticizes the plastic material and injects it into the tool at high pressure and velocity. For many parts it is critical that the plastic is injected at high velocity. As the plastic enters the cavity it cools rapidly initially forming a skin on the tool surfaces. The part is filled through in the small space or active flow path between the skins on the cavity and the core. This flow path becomes smaller very quickly. It is important that the part is filled completely before the flow path is frozen. It is also important that the initial skin formed on the tool surfaces is not disturbed or a cosmetic defect will be formed.

Once the part is filled the plastic will cool and shrink. This can create localized depressions or sink marks in the part surface. Sink can also pull the plastic skin away from the tool surface which can lead to a surface finish difference. To avoid sink, the injection pressure is maintained for some time to pack out the sink through the flow path, essentially filling in the shrinkage from inside the wall of the part. Packing or hold pressure is usually much lower than the injection pressure. A higher hold pressure can overpack the part increasing the density of the plastic locally. This can cause distortion or warpage of the part.

A variety of large plastic parts are produced today. These include automotive bumper skins, interior door panels, TV screen bezels and back covers as well as some smaller parts such as computer laptop covers and automotive B pillar trim parts. Larger parts have longer flow paths and a thicker wall can be used to ensure the part can be fully filled. To reduce the weight of a part and maintain a reasonably thin wall section on very large parts it becomes necessary to have more than 1 gate. Multiple gates create multiple flows of plastic in the tool. These flows meet and join as weld lines which are usually an unacceptable cosmetic and/or functional defect. To avoid these defects, current practices often use a sequential valve gate (SVG) system where the gates are opened in sequence to produce one flow of plastic. The opening of successive gates can create disturbances in the flow causing a variety of defects. For this writing, I will focus on how the hold pressure and time is applied to control the packing of large parts.

SUMMARY OF THE INVENTION

Current industry practice with an SVG system often involves opening and closing the gate multiple times. As each gate is opened in succession the local region of the part is filled. Then the next gate is opened to fill the next section. Meanwhile the first section is still subject to full injection pressure which can over pack that section. To avoid this, the first gate is closed after filling the first section. Then after the entire part is filled the gate is opened again to use hold pressure to pack out that section. This is called Controlled Pack. The reopening of the gates can be a significant time after first fill so the wall of the part is mostly frozen which requires a higher hold pressure and longer hold time to ensure the sink is fully packed out. The higher pressure can again lead to over packing creating a higher density locally in the part and the corresponding warpage.

With the advent of advanced technology such as gate valve pin position and velocity control, other techniques can be used to more effectively fill and pack large parts. For a typical SVG system such as shown in FIG. 1, again the first gate associated with a centrally located nozzle N1 is opened to either a partially closed position or fully open position to fill the first section 300 of the part that is formed in the cavity 300 of the mold. Then the second gate(s) associated with downstream located nozzles n2, n3 are opened to fill the next section(s). At that point the first nozzle n1 gate valve pin p1 can be either held in an initially selected partially closed position or moved from an initially selected fully open position to a partially closed position for the remainder of the injection cycle to reduce the flow and pressure provided to the first section(s) 302 of the part that is formed in cavity 300. Then as the third gate(s) associated with the nozzles n4, n5 are opened the second gate(s) associated with nozzles n2, n3 are partially closed. Using this process allows the packing of each section 302, 304 immediately after filling. This process is called Progressive Fill.

With this technique the packing in each section 302, 304 will be sooner in the process. The wall section flow path will be thicker and more molten or active allowing a lower packing pressure. This can eliminate over packing and actually reduce the density of the part resulting in a lighter part with less plastic consumption and reduced warpage. It also can eliminate cosmetic defects caused by sink disturbing the plastic skin contact with the tool surfaces.

When the first section 302 of the part formed within cavity 300 is fully packed out, the gate(s) associated with nozzles n1-n5 can be closed. So the first sections 302 can be completely finished before the final sections 304 of the part formed within cavity 300 are completely filled.

In accordance with the invention, there is provided In an injection molding system (10) comprised of an injection molding machine (13) that injects injection fluid (18, 1153, 1154) into a heated manifold (40) that distributes the fluid to two or more nozzles (22, 24, 20) each having an associated gate (32, 34, 36) mated with a mold cavity (30), each nozzle having an associated valve pin (1040, 1041, 1042) controllably axially drivable upstream and downstream by an actuator (940, 941, 942) associated with each valve pin between a gate closed position (GC) at which flow of injection fluid is stopped and one or more axial positions (COP, COP2, COP3) upstream of the gate closed position (GC) at which flow of injection fluid through the gate into the mold cavity (30) is enabled, a method of performing an injection cycle having a duration comprising:

beginning the injection cycle with the valve pins associated with the two or more nozzles (n1, n2, n3, n4, n5, 22, 24, 20) in a gate closed position (GC), selecting a first one (n1, 22) of the two or more nozzles (n1, n2, n3, n4, n5, 22, 24, 20) and controllably driving its associated valve pin (1040) from the gate closed position to a selected first axial upstream position such that injection fluid flows through its associated gate downstream through the cavity a preselected distance, the gate associated with the first one of the two or more nozzles being located at a first position (32) entering the mold cavity (30), upon downstream flow of the injection fluid through the cavity the preselected distance (FFU, FFD), controllably driving the valve pin (1041, 1042) associated with the other of the two or more nozzles to a selected second axial position upstream ((COP, COP2, COP3) of the gated closed position such that injection fluid flows through its associated gate downstream through the cavity, the gate (34, 36) associated with the other of the two or more nozzles being located at a second position (34, 36) entering the cavity downstream of the first position (32), holding or controllably driving the valve pin (1040) associated with the first one of the two or more nozzles in or to one or more reduced flow axial upstream positions (COP, COP2) wherein a tip end of the valve pin associated with the first one of the two or more nozzles restricts flow of the injection fluid through the gate associated with the first one of the two or more nozzles to a selected rate of flow that is less than or reduced relative to a maximum rate of flow for a duration at least until the cavity is filled.

In such a method, the valve pin associated with the first one of the two or more nozzles is preferably held or controllably driven in or to the reduced flow axial upstream positions (COP, COP2) for a duration at least until the cavity is filled and packed.

The selected first axial upstream position is typically a reduced flow position (COP, COP2) wherein the tip end (1142) of the valve pin (1040) associated with the first one of the two or more nozzles restricts flow of the injection fluid through the gate associated with the first one of the two or more nozzles to a selected rate of flow that is less than the maximum rate of flow.

The selected first axial upstream position can be a fully open position (COP3, FOP) wherein injection fluid flows at the maximum rate of flow through the gate associated with the first one of the nozzles.

The preselected distance of flow of the injection fluid is typically selected distance downstream (FFD) of the second position (34) of the gate associated with the other of the two or more nozzles.

Such a method can further comprise holding or controllably driving the valve pin associated with the other of the two or more nozzles in or to one or more reduced flow axial upstream positions (COP, COP2) wherein a tip end (1142) of the valve pin (1041, 1042) associated with the other of the two or more nozzles restricts flow of the injection fluid through the gate associated with the other of the two or more nozzles to a selected rate of flow that is less than or reduced relative to a maximum rate of flow for a duration at least until the cavity is filled.

The valve pin associated with the other of the two or more nozzles can be held or controllably driven in or to the reduced flow axial upstream position for a duration at least until the cavity is filled and packed.

The selected second axial upstream position is typically a reduced flow position wherein the tip end of the valve pin associated with the other of the two or more nozzles restricts flow of the injection fluid through the gate associated with the other of the two or more nozzles to a selected rate of flow that is less than the maximum rate of flow.

The selected second axial upstream position can be a fully open position wherein injection fluid flows at the maximum rate of flow through the gate associated with the other of the two or more nozzles.

Such a method can further comprise:

detecting (TC1, TC2, TC3, TC4), at a downstream detection time, a select property of a flow front (FF) of the fluid material (18) flowing downstream at a trigger position within the cavity (30) disposed between the first gate (32) and at least one selected downstream gate (34, 36), instructing the actuator (a2, a3) of the nozzle associated with the at least one selected downstream gate (34, 36), to withdraw the valve pin (1041, 1042) from the gate closed position at an instruction time (X) comprising a predetermined open gate target time (X) following the downstream detection time, detecting, at an actual open gate time (A), withdrawal of the valve pin (1041, 104) from the at least one selected downstream gate (34, 36), determining an adjusted instruction time (X'), for use on a subsequent injection cycle, wherein the determining step comprises decreasing the time of instruction to the valve pin to open on a subsequent injection cycle by an adjustment time equal to any delay in time (Y) between the predetermined open gate target time (X) and the actual open gate time (A).

In another aspect of the invention there is provided, an injection molding system (10) for performing an injection cycle having a duration comprising an injection molding machine that injects injection fluid into a heated manifold that distributes the fluid to two or more nozzles each having an associated gate mated with a mold cavity, each nozzle having an associated valve pin controllably axially drivable upstream and downstream by an actuator associated with each valve pin between a gate closed position at which flow of injection fluid is stopped and one or more axial positions upstream of the gate closed position at which flow of injection fluid through the gate into the mold cavity is enabled, a controller containing instructions that instruct the actuators associated with each valve pin:

to begin the injection cycle with the valve pins associated with the two or more nozzles in a gate closed position, to select a first one of the two or more nozzles and controllably drive its associated valve pin from the gate closed position to a selected first axial upstream position such that injection fluid flows through its associated gate downstream through the cavity a preselected distance, the gate associated with the first one of the two or more nozzles being located at a first position entering the mold cavity, upon downstream flow of the injection fluid through the cavity the preselected distance, to controllably drive the valve pin associated with the other of the two or more nozzles to a selected second axial position upstream of the gated closed position such that injection fluid flows through its associated gate downstream through the cavity, the gate associated with the other of the two or more nozzles being located at a second position entering the cavity downstream of the first position, to hold or controllably drive the valve pin associated with the first one of the two or more nozzles in or to one or more reduced flow axial upstream positions wherein a tip end of the valve pin associated with the first one of the two or more nozzles restricts flow of the injection fluid through the gate associated with the first one of the two or more nozzles to a selected rate of flow that is less than or reduced relative to a maximum rate of flow for a duration at least until the cavity is filled.

In such an apparatus the instructions preferably include instructions that instruct the valve pin associated with the first one of the two or more nozzles to be held or controllably driven in or to the reduced flow axial upstream positions for a duration at least until the cavity is filled and packed.

In such an apparatus, the selected first axial upstream position is typically a reduced flow position wherein the tip end of the valve pin associated with the first one of the two or more nozzles restricts flow of the injection fluid through the gate associated with the first one of the two or more nozzles to a selected rate of flow that is less than the maximum rate of flow.

The selected first axial upstream position can be a fully open position wherein injection fluid flows at the maximum rate of flow through the gate associated with the first one of the nozzles.

The preselected distance of flow of the injection fluid is preferably a selected distance downstream of the second position of the gate associated with the other of the two or more nozzles.

The instructions can include instructions that instruct the actuators to hold or controllably drive the valve pin associated with the other of the two or more nozzles in or to one or more reduced flow axial upstream positions wherein a tip end of the valve pin associated with the other of the two or more nozzles restricts flow of the injection fluid through the gate associated with the other of the two or more nozzles to a selected rate of flow that is less than or reduced relative to a maximum rate of flow for a duration at least until the cavity is filled.

The valve pin associated with the other of the two or more nozzles is typically held or controllably driven in or to the reduced flow axial upstream position for a duration at least until the cavity is filled and packed.

The selected second axial upstream position is preferably a reduced flow position wherein the tip end of the valve pin associated with the other of the two or more nozzles restricts flow of the injection fluid through the gate associated with the other of the two or more nozzles to a selected rate of flow that is less than the maximum rate of flow.

The selected second axial upstream position can be a fully open position wherein injection fluid flows at the maximum rate of flow through the gate associated with the other of the two or more nozzles.

The apparatus can include an injection fluid property detector (TC1, TC2, TC3, TC4) that detects, at a downstream detection time, a select property of a flow front (FF) of the fluid material (18) flowing downstream at a trigger position within the cavity (30) disposed between the first gate (32) and at least one selected downstream gate (34, 36), the controller receiving a signal from the injection fluid property detector (TC1, TC2, TC3, TC4) and including instructions that instruct the actuator (a2, a3) of the nozzle associated with the at least one selected downstream gate (34, 36), to withdraw the valve pin (1041, 1042) from the gate closed position at an instruction time (X) comprising a predetermined open gate target time (X) following the downstream detection time, a position sensor (h2, h3, h4, h5) detecting, at an actual open gate time (A), withdrawal of the valve pin (1041, 1042) from the at least one selected downstream gate (34, 36), the controller receiving a signal from the position sensor (h2, h3, h4, h5) and including instructions that determine an adjusted instruction time (X'), for use on a subsequent injection cycle, wherein the instructions decreasing the time of instruction to the valve pin to open on a subsequent injection cycle by an adjustment time equal to any delay in time (Y) between the predetermined open gate target time (X) and the actual open gate time (A).

In another aspect of the invention there is provided, in an injection molding system (10) comprised of an injection molding machine (13) that injects injection fluid (18, 1153, 1154) into a heated manifold (40) that distributes the fluid to two or more nozzles (22, 24, 20) each having an associated gate (32, 34, 36) mated with a mold cavity (30), each nozzle having an associated valve pin (1040, 1041, 1042) controllably axially drivable upstream and downstream by an actuator (940, 941, 942) associated with each valve pin between a gate closed position (GC) at which flow of injection fluid is stopped and one or more axial positions (COP, COP2, COP3) upstream of the gate closed position (GC) at which flow of injection fluid through the gate into the mold cavity (30) is enabled, a method of performing an injection cycle having a duration comprising:

beginning the injection cycle with the valve pins associated with the two or more nozzles (n1, n2, n3, n4, n5, 22, 24, 20) in a gate closed position (GC), selecting a first one (n1, 22) of the two or more nozzles (n1, n2, n3, n4, n5, 22, 24, 20) and controllably driving its associated valve pin (1040) from the gate closed position to one or more selected first reduced flow axial upstream positions (COP, COP2) at which flow of the injection fluid through its associated gate (32) is reduced relative to a maximum flow rate when the valve pin (1040) is withdrawn to a maximum flow rate position (COP3, FOP), upon downstream flow of the injection fluid through the cavity (30) a preselected distance (FFU, FFD), controllably driving the valve pin (1041, 1042) associated with the other of the two or more nozzles to a selected second axial position upstream ((COP, COP2, COP3) of the gated closed position such that injection fluid flows through its associated gate (34, 36) downstream through the cavity, the gate (34, 36) associated with the other of the two or more nozzles being located at a second position (34, 36) downstream of the first position (32), holding or controllably driving the valve pin (1040) associated with the first one of the two or more nozzles in or to one or more reduced flow axial upstream positions (COP, COP2) for a duration at least until the cavity is filled.

In such a method, the valve pin (1040) associated with the first one of the two or more nozzles is held or controllably driven in or to the reduced flow axial upstream positions (COP, COP2) for a duration at least until the cavity is filled and packed.

The preselected distance of flow of the injection fluid is preferably a selected distance downstream (FFD) of the second position (34) of the gate associated with the other of the two or more nozzles.

Such a method can further comprise holding or controllably driving the valve pin associated with the other of the two or more nozzles in or to one or more reduced flow axial upstream positions (COP, COP2) wherein a tip end (1142) of the valve pin (1041, 1042) associated with the other of the two or more nozzles restricts flow of the injection fluid through the gate associated with the other of the two or more nozzles to a selected rate of flow that is less than or reduced relative to a maximum rate of flow for a duration at least until the cavity is filled.

The valve pin associated with the other of the two or more nozzles is preferably held or controllably driven in or to the reduced flow axial upstream position for a duration at least until the cavity is filled and packed.

The selected second axial upstream position can be a reduced flow position wherein the tip end of the valve pin associated with the other of the two or more nozzles restricts flow of the injection fluid through the gate associated with the other of the two or more nozzles to a selected rate of flow that is less than the maximum rate of flow.

The selected second axial upstream position can be a fully open position wherein injection fluid flows at the maximum rate of flow through the gate associated with the other of the two or more nozzles.

Such a method can further comprise:
  detecting (TC1, TC2, TC3, TC4), at a downstream detection time, a select property of a flow front (FF) of the fluid material (18) flowing downstream at a trigger position within the cavity (30) disposed between the first gate (32) and at least one selected downstream gate (34, 36),
  instructing the actuator (a2, a3) of the nozzle associated with the at least one selected downstream gate (34, 36), to withdraw the valve pin (1041, 1042) from the gate closed position at an instruction time (X) comprising a predetermined open gate target time (X) following the downstream detection time,
  detecting, at an actual open gate time (A), withdrawal of the valve pin (1041, 104) from the at least one selected downstream gate (34, 36),
  determining an adjusted instruction time (X'), for use on a subsequent injection cycle, wherein the determining step comprises decreasing the time of instruction to the valve pin to open on a subsequent injection cycle by an adjustment time equal to any delay in time (Y) between the predetermined open gate target time (X) and the actual open gate time (A).

In another aspect of the invention there is provided an injection molding system (10) comprising an injection molding machine (13) that injects injection fluid (18, 1153, 1154) into a heated manifold (40) that distributes the fluid to two or more nozzles (22, 24, 20) each having an associated gate (32, 34, 36) mated with a mold cavity (30), each nozzle having an associated valve pin (1040, 1041, 1042) controllably axially drivable upstream and downstream by an actuator (940, 941, 942) associated with each valve pin between a gate closed position (GC) at which flow of injection fluid is stopped and one or more axial positions (COP, COP2, COP3) upstream of the gate closed position (GC) at which flow of injection fluid through the gate into the mold cavity (30) is enabled, a controller containing instructions that instruct the actuators associated with each valve pin:
  to begin the injection cycle with the valve pins associated with the two or more nozzles (n1, n2, n3, n4, n5, 22, 24, 20) in a gate closed position (GC),
  to select a first one (n1, 22) of the two or more nozzles (n1, n2, n3, n4, n5, 22, 24, 20) and controllably drive its associated valve pin (1040) from the gate closed position to one or more selected first reduced flow axial upstream positions (COP, COP2) at which flow of the injection fluid through its associated gate (32) is reduced relative to a maximum flow rate when the valve pin (1040) is withdrawn to a maximum flow rate position (COP3, FOP),
  upon downstream flow of the injection fluid through the cavity (30) a preselected distance (FFU, FFD), to controllably drive the valve pin (1041, 1042) associated with the other of the two or more nozzles to a selected second axial position upstream ((COP, COP2, COP3) of the gated closed position such that injection fluid flows through its associated gate (34, 36) downstream through the cavity, the gate (34, 36) associated with the other of the two or more nozzles being located at a second position (34, 36) downstream of the first position (32),
  to hold or controllably drive the valve pin (1040) associated with the first one of the two or more nozzles in or to one or more reduced flow axial upstream positions (COP, COP2) for a duration at least until the cavity is filled.

Such an apparatus can further include an injection fluid property detector (TC1, TC2, TC3, TC4) that detects, at a downstream detection time, a select property of a flow front (FF) of the fluid material (18) flowing downstream at a trigger position within the cavity (30) disposed between the first gate (32) and at least one selected downstream gate (34, 36),
the controller receiving a signal from the injection fluid property detector (TC1, TC2, TC3, TC4) and including instructions that instruct the actuator (a2, a3) of the nozzle associated with the at least one selected downstream gate (34, 36), to withdraw the valve pin (1041, 1042) from the gate closed position at an instruction time (X) comprising a predetermined open gate target time (X) following the downstream detection time,
a position sensor (h2, h3, h4, h5) detecting, at an actual open gate time (A), withdrawal of the valve pin (1041, 1042) from the at least one selected downstream gate (34, 36),
the controller receiving a signal from the position sensor (h2, h3, h4, h5) and including instructions that determine an adjusted instruction time (X'), for use on a subsequent injection cycle, wherein the instructions decreasing the time of instruction to the valve pin to open on a subsequent injection cycle by an adjustment time equal to any delay in time (Y) between the predetermined open gate target time (X) and the actual open gate time (A).

In another aspect of the invention there is provided a method of performing an injection molding cycle comprising operating any of the systems or apparatuses (10) as described above to form an injection molded article in the cavity of the mold.

BRIEF DESCRIPTION OF THE DRAWINGS

FIGS. 3A and 3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum;

FIGS. 4A-4B show a system having a valve pin that has a cylindrically configured tip end, the tips ends of the pins being positioned at various times and positions between a starting closed position as in FIG. 5A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum.

DETAILED DESCRIPTION OF INVENTION

Figure 1:
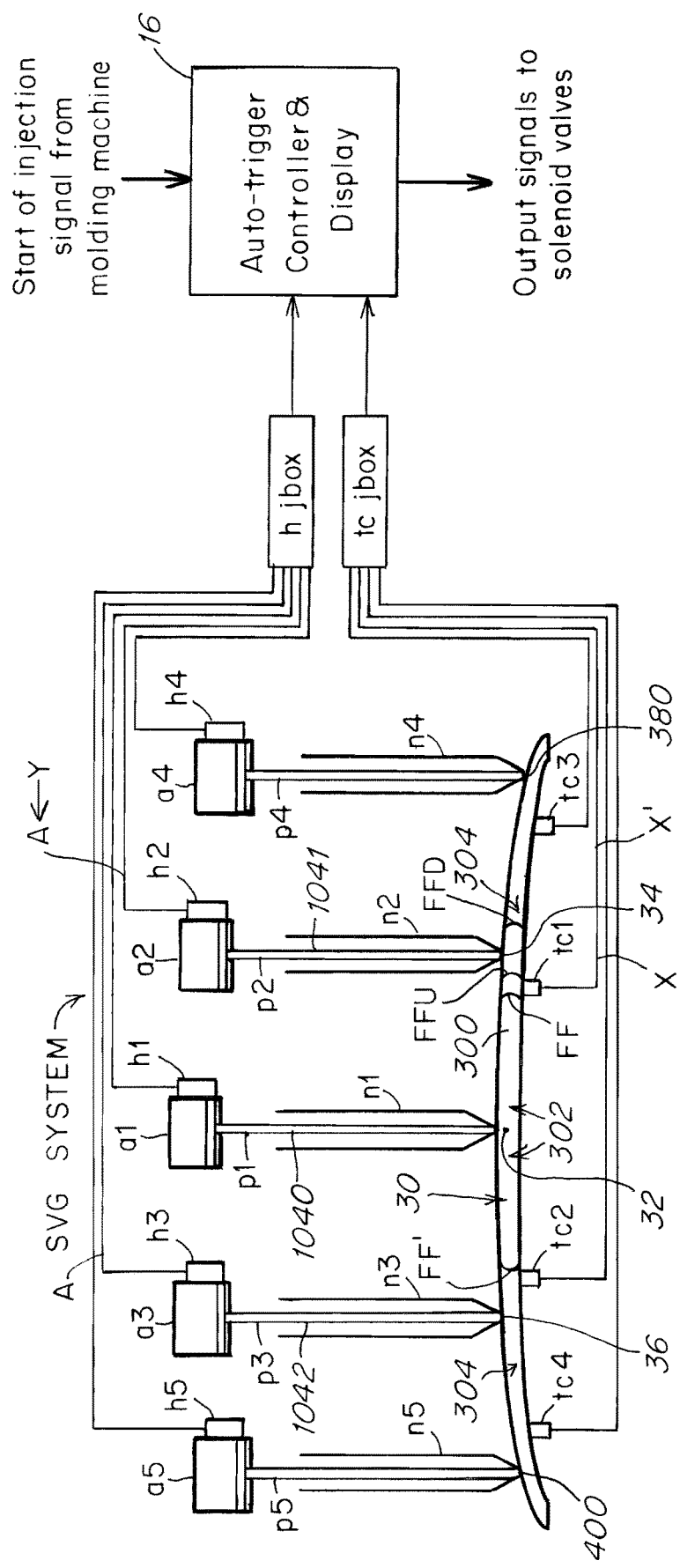
FIG. 1 is a schematic of a series of five valve gates gated at preselected locations into a single cavity each valve controlled by a controller that controls both the sequence of opening of the valve pins of each valve and the axial positioning of each pin during the course of an injection cycle according to a program executed by the controller.

FIG. 1 shows an injection molding system comprised of a mold having a large cavity 300 that is fed by multiple nozzles n1-n5 each having a controller controlled valve pin p1-p5. At the beginning of an injection cycle all valve pins p1-p5 are all disposed in a gate closed, GC, FIGS. 3A, 4A, position. When the cycle begins a selected nozzle n1 and valve pin p1 is opened first while the others remain closed until triggered to open at a later time. The n1 nozzle and associated pin p1 are selected to withdraw to open the associated gate first because the nozzle n1 has a gate that is disposed at the center of the cavity 300 with the other nozzles N2-N5 having gates that are disposed at positions downstream of the gate of nozzle n1.

In the embodiment shown temperature sensors tc1-tc4 are used to effect an automatic triggering of the gates to open. Other sensors such as pressure sensors that detect a fluid property in the cavity 300 could alternatively be used. The temperature sensors tc1-tc4 are selectively mounted at selected positions within the mold cavity to detect temperature of the injection fluid that travels from the position of the gate associated with center nozzle n1 gate downstream toward and past the gates associated with the n2-n5 nozzles. The temperature sensors tc1-tc4 sense the temperature of the fluid material flowing downstream at a trigger position within the cavity 300. The temperature sensors tc1-tc4 send a temperature signal indicative of the time of sensing of the temperature of the fluid material at the trigger position to a controller as shown in FIG. 1 The controller receives the temperature signals and includes a set of instructions that instruct the actuators a1-a5 associated with the gates of nozzles n1-n5 to withdraw the valve pins p1-p5 from the initial gate closed positions at a selected trigger times following the indicative time of the first temperature signal to one or more partially gate open positions.

In the embodiment shown, the system can include position sensors h1-h5 that detect the actual axial position of the valve pins p1-p5 at any given time. As a means of correction, the downstream position sensors h2-h5 detect the axial positions of their associated valve pins p2-p5 so that the trigger times can be adjusted to ensure that the gates are actually partially open at the selected times without a delay beyond the selected times. The controller receives the signals from the position sensors p1-p5 and includes a set of instructions that calculates and stores the difference in time between the actual time at which the position sensors h1-h5 sense that the valve pins p1-p5 have been actually withdrawn from their initial gate closed positions and their trigger times as established by the sensing of fluid by the temperature sensors tc1-tc4, and adjusts the trigger times on a subsequent injection cycle by the calculated difference in time for the actuators a1-a5 and their associated valve pins p1-p5.

The trigger time following the indicative time of the first temperature signal typically ranges from between 0 seconds and about 20 seconds.

Figure 2:
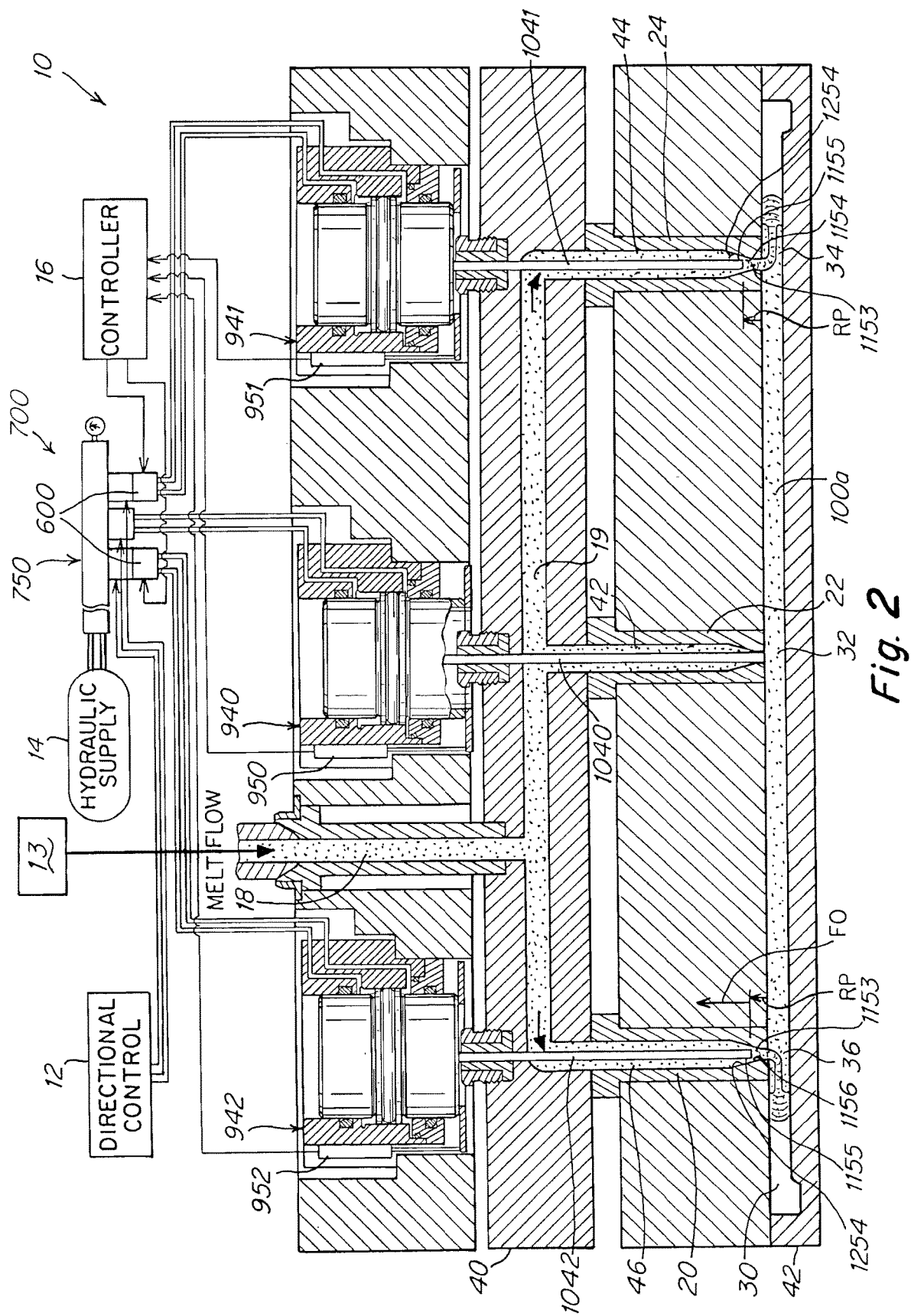
FIG. 2 is a side schematic sectional view of a generic sequentially valve gated system showing three valves gated into a single cavity and showing a typical configuration of system components including a directional control valve, controller, position sensors for each valve and arrangement of a downstream valves relative to a central selected valve and associated gate.

An example of a fully assembled system is shown in FIG. 2 which illustrates the configuration of a series of hydraulic actuators 940 (analogous to a1), 941 (analogous to a2) and 942 (analogous to a3) assembled in a full injection molding system. As shown, the system 10 comprises an injection molding machine 13 that injects an injection fluid 18 into a heated manifold 40 that distributes the fluid 18 to the channels of the nozzles, nozzle 22 corresponding to n1 of FIG. 1, nozzle 24 corresponding to n2 and nozzle 20 corresponding to n3.

As described above, the valve pins p1-p5 are sequentially opened at selected sequentially occurring times, the p1 pin being opened first and p2-p3 second and p4-p5 third. In order to implement the partially closed gates and thus reduce the flow and pressure of the injection pressure through any selected nozzle n1-n5 to a pressure and flow rate that is less than the maximum pressure and flow that is established by the injection molding machine 13, the nozzles and pins are configured and controlled in their axial positioning as shown in FIGS. 3A-4B.

FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum;

FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum.

The valve pins p1-p5 and the gates associated with the nozzles n1-n5 are configured or adapted to cooperate with each other to restrict and vary the rate of flow of fluid material 1153 as shown in FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 at any position extending over the length of the restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP (which is, for example the 4 mm upstream travel position of FIGS. 5A-5C).

When the tip end 1142 of the pin 1041 has travelled upstream from the gate closed GC position (as shown for example in FIGS. 3A, 4A) through the length of the RP path, the rate of material fluid flow 1153 through restriction gap 1154 through the gate 34 into the cavity 30 increase from 0 at gate closed GC position to a maximum flow rate when the tip end 1142 of the pin reaches a position FOP (full open position), FIGS. 5A-5D, where the pin is no longer restricting flow of injection mold material through the gate. At the expiration of the predetermined amount of time while the pin tip 1142 has been held in a selected partially closed position, the pin 1041 is immediately driven by the hydraulic system to a fully closed position.

In alternative embodiments, when the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2. In the alternative examples shown in the FIGS. 3B, 4B examples, when the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In the FIGS. 5A, 5B examples, the upstream FOP position is about 4 mm and 5 mm respectively upstream from the gate closed position. Other alternative upstream FOP positions are shown in FIGS. 5C, 5D.

In another alternative embodiment, shown in FIG. 4B, the pin 1041 can be configured to have a completely cylindrical contour and still be selectively positioned at partially open positions over the length of the restricted path RP.

The user typically programs controller 16 via data inputs on a user interface to instruct the hydraulic system 700 to drive pins 1040 1041, 1042 at an upstream velocity of travel that is reduced relative to a maximum velocity that the hydraulic system can drive the pins 1040, 1041, 1042 to travel.

FIG. 1 shows position sensors h1, h2, h3, h4, h5. FIG. 2 shows analogous or corresponding position sensors 950, 951, 952 for sensing the position of the actuator cylinders 940, 941, 942 and their associated valve pins (such as 1040, 1041, 1042) and feed such position information to controller 16 for monitoring purposes. As shown, fluid material 18 is injected from an injection machine into a manifold runner 19 and further downstream into the bores 42, 44, 46 of the nozzles 22, 24, 26, n1, n2, n3, n4, n5 and ultimately downstream through the gates 32, 34, 36. When the pins 1041, 1042 are withdrawn upstream to a position where the tip end of the pins 1040, 1041 are in a fully upstream open position such as COP3 or FOP, the rate of flow of fluid material through the gates 32, 34, 36 is at a maximum. However when the pins 1041, 1042 are initially withdrawn beginning from the closed gate position, FIG. 1A, to intermediate upstream positions, FIGS. 3B, 4B, a gap 1154, 1156 that restricts the velocity of fluid material flow is formed between the outer surfaces 1155 of the tip end of the pins 43, 44, 46 and the inner surfaces 1254, 1256 of the gate areas of the nozzles 20, 22, 24. The restricted flow gap 1154, 1156 remains small enough to restrict and reduce the rate of flow of fluid material 1153 through gates 34, 36 to a rate that is less than maximum flow velocity over a travel distance RP, RP2 of the tip end of the pins 1041, 1042 going from closed to upstream as shown in FIGS. 1, 1B, 10, 1E and 3B, 4B.

Preferably, the valve pin and the gate are configured or adapted to cooperate with each other to restrict and vary the rate of flow of fluid material 1153, FIGS. 3A-3B, 4A-4B over the course of travel of the tip end of the valve pin through the restricted velocity path RP, RP2. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP, RP2.

In one embodiment, the tip end 1142 of the pin 1040, 1041, 1042 can be initially withdrawn from the gate closed position to a position, COP3, FOP where the pin is no longer restricting flow of injection mold material through the gate 32, 34, 36 so that the time of filling of the cavity 30 is minimized. As shown the longer upstream path length RP3 has an upstream portion UR where the flow of injection fluid mold material is not restricted (less than RP, RP2) but flows at a maximum rate through the gate 32, 34, 36. In such an embodiment, after the valve pin 1040, 1041, 1042 has been initially withdrawn upstream to a full unrestricted injection fluid flow position the valve pin 1040, 1041, 1042 is subsequently driven downstream to a reduced flow position COP, COP2 for the duration or remaining course of the injection cycle.

The start of an injection cycle is triggered by a "Start of Injection Signal" sent from injection molding machine 13 to the controller 16. The controller then sends output signals to solenoid valves that drive each actuator, a1, a2, a3, a4, a5. The first gate to open during an injection molding cycle is the central gate 32 of central nozzle 22 controlled by actuator a1, 940 and arranged so as to feed into cavity 30 at an entrance point (gate 32) that is disposed at about the longitudinal center of the elongated mold cavity 30. As shown in FIGS. 1, 2 a first adjacent set of lateral downstream nozzles 22, 20, disposed laterally adjacent either side of the central nozzle 22, n1 feed fluid material to downstream gates 34, 36 disposed laterally an equal distance on either side of the central gate 32. A second set of lateral downstream nozzles n4, n5, downstream of the first pair of lateral nozzles n2, n3, feed fluid material into the mold cavity at gate locations 380, 400 respectively that are downstream of the center gate 32 and downstream of the gates 34, 36 of the first lateral set of nozzles n2, n3.

The injection cycle is a cascade process where injection is effected in a sequence from the center nozzle 32 and then at a later predetermined time from the first set of downstream nozzles n2, n3, and at a still later predetermined time from the second set of further downstream nozzles n4, n5. As shown, the injection cycle is started by first opening the center gate 32 into mold cavity 30 by withdrawing the distal tip 1142 of the center valve pin 1040 from the gate 32 and allowing fluid material to flow outwardly from nozzle passage 42 into the cavity and form a flow stream moving in opposing lateral directions from the center gate 32, creating two opposing flow fronts FF, FF' moving laterally to the right toward next downstream gate 34 and moving laterally to the left toward next downstream gate 36. In accordance with the present embodiment, a plurality of cavity sensors tc1, tc2, tc3, tc4 are disposed in or adjacent to the mold cavity 30 for detecting the arrival of flow fronts FF and FF' at each respective cavity sensor location tc1, tc2, tc3, tc4 (also referred to as a trigger location). More specifically, between each adjacent set of upstream and downstream nozzle gates, there is disposed a respective cavity sensor for detecting when the flow front reaches the vicinity of the downstream gate, referred to herein as a detection arrival DA. When this occurs, a signal is sent to the controller 16 to cause a sequence of subsequent actions that initiate withdrawal of the valve pin 1041, 1042 of the associated downstream gate 34, 36 (by sending a signal to the associated downstream actuator a2, a3, to open the downstream 34, 36 at a predetermined open gate target time (X), specific to that gate, as well as monitoring and detection of the actual open gate time (A) of withdrawal of the valve pin from the downstream gate and generating a signal (sent to controller 16) indicative of actual open gate time (A). The controller then determines whether there is a difference between the predetermined open gate target time (A) and the actual open gate time (A). This difference, referred to as a delay time (Y), can be used to modify the instruction time for initiating withdrawal of the downstream valve pin from the downstream gate during a next or subsequent injection cycle, with a goal toward minimizing or eliminating the time difference.

FIG. 2 shows the opposing flow fronts FF, FF' moving toward the first set of lateral downstream gates 34, 36. When the flow front FF is adjacent to or at the cavity sensor tc1 associated with downstream gate 34 (of nozzle 24), the cavity sensor tc1 detects a selected physical condition (e.g., temperature) that signals arrival of the flow front FF of the fluid material at the cavity sensor location located between the upstream gate 32 and the downstream gate 34, and generates a detection arrival signal indicative of the time of the detected arrival of the flow front FF. This detection arrival signal is sent to controller 16 to initiate an instruction signal to actuator a2 (associated with nozzle 24 to cause subsequent withdrawal of the distal tip of valve pin 1041 from gate 34 at a predetermined open gate target time (X) subsequent to the detected arrival time. A similar series of events occurs for the opposing flow front FF' as it reaches the cavity sensor tc2 and generates a detection arrival signal for initiating a subsequent withdrawal of valve pin 1042 from gate 36.

The above process is continued until all valve pins are open and the molded part is filled. Typically, the valve pins 1040, 1041, 1042 all remain open in a restricted or reduced flow position (COP, COP2) until the end of a packing period, and then the valve gates are closed by a signal from the injection machine.

Thus, in accordance with the present invention, adjustments to the instruction time (X) for use in a subsequent cycle can be made where there is a detected difference (delay Y) between the predetermined open gate target time (X) (desired opening time) and actual open gate time (A). Modification of the instruction time (X) can be automatically accomplished by the controller and utilized in the next cycle. Still further, if a valve pin fails to open or is slow in opening, the system may provide an alarm that is activated by such an event.

By way of example, a predetermined open gate target time (X) may be 0.3 seconds, and the actual open gate target time (A) may be 0.4 seconds, meaning there is a difference or delay Y of 0.1 seconds (0.4−0.3=0.1). The adjusted instruction time $X^1$ is then determined to be X−Y, namely 0.3−(0.4−0.3)=0.2 seconds. On the next or subsequent cycle the modified instruction time (X') will be 0.2 seconds.

It has been found that triggering based on the flow front detection, instead of the time or screw position, can significantly enhance the quality of the molded parts. It can also substantially reduce the set-up time and reduce the need for highly experienced operators. The triggering process can be used to automatically adjust the open gate instruction time (X) when melt viscosity changes, from one cycle to the next. The actual valve pin opening times can be displayed on a user interface (e.g., a computing device 80 with a display and user input as shown in FIG. 1), thus enabling an operator to monitor the performance of the sequential process and make manual adjustments (e.g., to the timing, temperature, pressure or other system parameters) if desired.

In a typical embodiment, the trigger times for withdrawing the downstream valve pins 34, 36 upstream out of the gate closed position, is selected so that the flow front FFD of the injection fluid in the cavity has travelled a distance downstream from the main gate 32 past the position FFD of the downstream gates 34, 36 so that injection fluid flowing through gates 34, 36 is more smoothly and with less disruption to the fluid flow incorporated into the flow of injection fluid as it travels downstream to fill the entire space of the cavity 30. In an alternative embodiment, the trigger times for withdrawing the downstream valve pins 34, 36 upstream out of the gate closed position GC, can be selected such that the downstream gates 34, 36 are opened before flow front FFU of the injection fluid in the cavity 30 has travelled past the position of the downstream gates 34, 36.

What is claimed is:

1. An injection molding system for performing an injection cycle comprising:
   a heated manifold arranged to distribute an injection fluid to two or more nozzles, each nozzle having an associated gate mated with a mold cavity, each nozzle further having an associated valve pin controllably axially drivable upstream and downstream by an actuator associated with each valve pin between a gate closed position at which flow of the injection fluid is stopped and one or more axial positions upstream of the gate closed position at which flow of the injection fluid through the mold cavity is enabled; and a controller arranged to execute instructions that instruct the actuators associated with each valve pin to:

begin the injection cycle with the valve pins associated with the two or more nozzles in a gate closed position;

select a first one of the two or more nozzles and controllably drive its associated valve pin from the gate closed position upstream to one or more first axial upstream positions at which a tip end of the valve pin associated with the first one of the two or more nozzles restricts flow of the injection fluid through a first gate associated with the first one of the two or more nozzles to a selected rate of flow that is less than or reduced relative to a maximum rate of flow;

hold the valve pin associated with the first one of the two or more nozzles in the one or more first axial upstream positions such that injection fluid flows through the first gate downstream through the cavity a preselected distance, wherein the first gate is located at a first position entering the mold cavity;

controllably drive the valve pin associated with the other of the two or more nozzles upon downstream flow of the injection fluid through the cavity the preselected distance to a selected second axial upstream position of the gated closed position such that injection fluid flows through a second gate associated with the other of the two or more nozzles downstream through the cavity, wherein the second gate is located at a second position entering the cavity downstream of the first position; and hold the valve pin associated with the first one of the two or more nozzles in the one or more first axial upstream positions for a duration at least until the cavity is filled.

2. The injection molding system of claim 1 wherein the instructions include instructions that instruct the valve pin associated with the first one of the two or more nozzles to be held or controllably driven in or to the reduced flow axial upstream positions for a duration at least until the cavity is filled and packed.

3. The injection molding system of claim 1 wherein the selected first axial upstream position is a reduced flow position wherein the tip end of the valve pin associated with the first one of the two or more nozzles restricts flow of the injection fluid through the gate associated with the first one of the two or more nozzles to a selected rate of flow that is less than the maximum rate of flow.

4. The injection molding system of claim 1 wherein the instructions include instructions that instruct the valve pin associated with the first one of the two or more nozzles to be held or controllably driven in or to another axial upstream position that is a fully open position wherein injection fluid flows at the maximum rate of flow through the gate associated with the first one of the nozzles.

5. The injection molding system of claim 1 wherein the preselected distance of flow of the injection fluid is a selected distance downstream of the second position of the second gate associated with the other of the two or more nozzles.

6. The injection molding system of claim 1 wherein the instructions include instructions that instruct the actuators to hold or controllably drive the valve pin associated with the other of the two or more nozzles in or to one or more reduced flow axial upstream positions wherein a tip end of the valve pin associated with the other of the two or more nozzles restricts flow of the injection fluid through the gate associated with the other of the two or more nozzles to a selected rate of flow that is less than or reduced relative to the maximum rate of flow for a duration at least until the cavity is filled.

7. The injection molding system of claim 1 wherein the valve pin associated with the other of the two or more nozzles is held or controllably driven in or to the reduced flow axial upstream position for a duration at least until the cavity is filled and packed.

8. The injection molding system of claim 1 wherein the selected second axial upstream position is a reduced flow position wherein a tip end of the valve pin associated with the other of the two or more nozzles restricts flow of the injection fluid through the gate associated with the other of the two or more nozzles to a selected rate of flow that is less than the maximum rate of flow.

9. The injection molding system of claim 1 wherein the instructions include instructions that instruct the actuators to hold or controllably drive the valve pin associated with the other of the two or more nozzles in or to one or more second axial upstream positions that are a fully open position wherein injection fluid flows at the maximum rate of flow through the gate associated with the other of the two or more nozzles.

10. The injection molding system of claim 1 wherein the apparatus includes an injection fluid property detector that detects, at a downstream detection time, a select property of a flow front of the fluid material flowing downstream at a trigger position within the cavity disposed between the first gate and at least one selected downstream gate, the controller receiving a property signal from the injection fluid property detector indicative of the downstream detection time and including instructions that instruct the actuator of the nozzle associated with the at least one selected downstream gate to withdraw the valve pin from the gate closed position at a predetermined target time determined by the downstream detection time.

11. The injection molding system of claim 10 including a position sensor that detects, at an actual open gate time, withdrawal of the valve pin from the at least one selected downstream gate, the controller receiving a signal from the position sensor and including instructions that determine an adjusted instruction time, for use on a subsequent injection cycle, wherein the instructions decrease a time of instruction to the valve pin to open on a subsequent injection cycle by an adjustment time equal to any delay in time between the predetermined target time and the actual open gate time.

12. An injection molding system for performing an injection cycle comprising:

a heated manifold arranged to distribute an injection fluid to two or more nozzles, each nozzle having an associated gate mated with a mold cavity, each nozzle further having an associated valve pin controllably axially drivable upstream and downstream by an actuator associated with each valve pin between a gate closed position at which flow of the injection fluid is stopped and one or more axial positions upstream of the gate closed position at which flow of the injection fluid through the gate into the mold cavity is enabled; and a controller arranged to execute instructions that instruct the actuators associated with each valve pin to:

begin the injection cycle with the valve pins associated with the two or more nozzles in a gate closed position;

select a first one of the two or more nozzles and controllably drive its associated valve pin from the gate closed position upstream to one or more first axial upstream positions at which a tip end of the valve pin associated with the first one of the two or more nozzles restricts flow of the injection fluid through a first gate associated with the first one of the two or more nozzles to a selected rate of flow that is less than or reduced relative to a maximum rate of flow, hold the valve pin associated with the first one of the two or more nozzles in the one or more first axial upstream positions such that injection fluid flows through the first gate downstream through the cavity a preselected distance, wherein the first gate is located at a first position entering the mold cavity;

controllably drive the valve pin associated with the other of the two or more nozzles upon downstream flow of the injection fluid through the cavity the preselected distance to a selected second axial upstream position of the gated closed position such that injection fluid flows through a second gate associated with the other of the two or more nozzles downstream through the cavity, wherein the second gate is located at a second position entering the cavity downstream of the first position;

wherein the injection molding system includes an injection fluid property detector that detects, at a downstream detection time, a select property of a flow front of the fluid material at a selected trigger position within the cavity disposed between the first gate and at least one selected downstream gate, wherein the controller receives a property signal from the injection fluid property detector indicative of the downstream detection time and includes instructions that instruct the actuator of the nozzle associated with the at least one selected downstream gate to withdraw the valve pin from the gate closed position at a predetermined target time determined by the downstream detection time.

13. The injection molding system of claim 12 including a position sensor that detects, at an actual open gate time, withdrawal of the valve pin from the at least one selected downstream gate, the controller receiving a signal from the position sensor and including instructions that determine an adjusted instruction time, for use on a subsequent injection cycle, wherein the instructions decrease a time of instruction to the valve pin to open on a subsequent injection cycle by an adjustment time equal to any delay in time between the predetermined target time and the actual open gate time.

14. The injection molding system of claim 12 wherein the instructions include instructions that instruct the actuator associated with the first one of the two or more nozzle to hold its associated valve pin in the one or more first axial upstream positions for a duration at least until the cavity is filled.

15. The injection molding system of claim 12 wherein the instructions include instructions that instruct the valve pin associated with the first one of the two or more nozzles to be held or controllably driven in or to the reduced flow axial upstream positions for a duration at least until the cavity is filled and packed.

16. The injection molding system of claim 12 wherein the instructions include instructions that instruct the actuators to hold or controllably drive the valve pin associated with the other of the two or more nozzles in or to one or more reduced flow axial upstream positions wherein a tip end of the valve pin associated with the other of the two or more nozzles restricts flow of the injection fluid through the gate associated with the other of the two or more nozzles to a selected rate of flow that is less than or reduced relative to a maximum rate of flow for a duration at least until the cavity is filled.

17. An injection molding system for performing an injection cycle comprising:

a heated manifold that distributes an injection fluid to two or more nozzles each having an associated gate mated with a mold cavity, each nozzle having an associated valve pin controllably axially drivable upstream and downstream by an actuator associated with each valve pin between a gate closed position at which flow of the injection fluid is stopped and one or more axial positions upstream of the gate closed position at which flow of the injection fluid through the gate into the mold cavity is enabled, a controller containing instructions that instruct the actuators associated with each valve pin to:

begin the injection cycle with the valve pins associated with the two or more nozzles in a gate closed position, select a first one of the two or more nozzles and controllably drive its associated valve pin from the gate closed position upstream to one or more first axial upstream positions at which a tip end of the valve pin associated with the first one of the two or more nozzles restricts flow of the injection fluid through a first gate associated with the first one of the two or more nozzles to a selected rate of flow that is less than or reduced relative to a maximum rate of flow, hold the valve pin associated with the first one of the two or more nozzles in the one or more first axial upstream positions such that injection fluid flows through the first gate downstream through the cavity a preselected distance, wherein the first gate is located at a first position entering the mold cavity, controllably drive the valve pin associated with the other of the two or more nozzles upon downstream flow of the injection fluid through the cavity the preselected distance to a selected second axial upstream position of the gated closed position such that injection fluid flows through a second gate associated with other of the two nozzles downstream through the cavity, wherein the second gate is located at a second position entering the cavity downstream of the first position, wherein the apparatus includes an injection fluid property detector that detects, at a downstream detection time, a select property of a flow front of the fluid material at a selected trigger position within the cavity disposed between the first gate and at least one selected downstream gate, wherein the controller receives a property signal from the injection fluid property detector indicative of the downstream detection time and includes instructions that instruct the actuator of the nozzle associated with the at least one selected downstream gate to withdraw the valve pin from the gate closed position at a predetermined target time determined by the downstream detection time, wherein the apparatus includes a position sensor that detects, at an actual open gate time, withdrawal of the valve pin from the at least one selected downstream gate, the controller receiving a signal from the position sensor indicative of the actual open gate time and including instructions that determine an adjusted instruction time, for use on a subsequent injection cycle, wherein the instructions decrease a time of instruction to the valve pin to open on a subsequent injection cycle by an adjustment time equal to any delay in time between the predetermined target time and the actual open gate time.

18. The injection molding system of claim 17 wherein the apparatus includes an injection fluid property detector that detects, at a downstream detection time, a select property of a flow front of the fluid material at a selected trigger position within the cavity disposed between the first gate and at least one selected downstream gate, wherein the controller receives a property signal from the injection fluid property detector indicative of the downstream detection time and includes instructions that instruct the actuator of the nozzle associated with the at least one selected downstream gate to withdraw the valve pin from the gate closed position at the predetermined target time that is determined by the downstream detection time.

19. The injection molding system of claim 17 wherein the instructions include instructions that instruct the actuator associated with the first one of the two or more nozzle to hold its associated valve pin in the one or more first axial upstream positions for a duration at least until the cavity is filled.

20. The injection molding system of claim 17 wherein the instructions include instructions that instruct the valve pin associated with the first one of the two or more nozzles to be held or controllably driven in or to the reduced flow axial upstream positions for a duration at least until the cavity is filled and packed.

* * * * *